2,880,152

PHOTOPOLYMERIZATION PROCESS

Arnold A. Hiltz, Linwood, and Edward G. Lendrat, Narberth, Pa., assignors to American Viscose Corporation, Philadelphia, Pa., a corporation of Delaware No Drawing. Application November 23, 1956
Serial No. 623,789

14 Claims. (Cl. 204—158)

This invention is directed to an improved method of catalytically photopolymerizing ethylenically unsaturated compounds.

Many unsaturated monomers can be caused to polymerize by ultraviolet light, without the addition of any photosensitizing substance. The wavelength of the ultraviolet light required in most cases is, however, so short as to require the use of light sources and reaction vessels constructed of fused quartz or another substance transparent to short ultraviolet light, a grave disadvantage in practical commercial operations. Furthermore, the readily available means for producing short ultraviolet radiations (below 3000 Angstrom units) cheaply and with high intensity produce light of certain narrow wavelengths, as for example the Mercury spectral line of wavelength at 2537 Angstrom units, and the available wavelengths may be so strongly absorbed by the polymerization system that they are capable of penetrating and affecting only a thin layer of material at the surface upon which the light is incident. For these and other reasons it is an object of this invention to devise a process wherein small amounts of photosensitizers are added to polymerizable monomers, and the latter are then polymerized by the action of light of longer wavelengths, which can be produced and applied more cheaply and conveniently. Photosensitizers are substances capable of absorbing light of wavelengths longer than those required for polymerization of the monomer alone and, under the action of the absorbed light, undergoing some chemical change whereby they become active initiators of the polymerization of the monomer.

Examples of the use of photoinitiators in photopolymerization have been described in the literature. For instance, methyl methacrylate containing lauroyl peroxide and benzoin (as light absorber) was polymerized with visible light (U.S. Patent No. 2,367,670). Diketones which absorb ultraviolet light and which do not contain inhibiting groups are also effective photosensitizers of methacrylic esters (U.S. Patent No. 2,367,660). A number of azo catalysts are also effective photoinitiators for the polymerization of vinyl monomers (U.S. Patent No. 2,471,959). In a recent patent (U.S. Patent No. 2,722,-512), Crandall describes the photopolymerization of vinyl monomers with light of wavelength between 2500 and 7000 A., and alpha-substituted acyloins as photoinitiators.

It is the object of the present invention to provide means for effecting photosensitized photopolymerization by means of a sensitizer having wholly different chemical nature and solubility characteristics from those previously known in the art, which has particular applicability to aqueous polymerization systems, though not limited to such systems.

We have discovered that if a small amount of a soluble salt of tin, in which the tin atom is divalent, as, for example, stannous chloride ($SnCl_2$), is added to a solution of a polymerizable unsaturated monomer in a suitably chosen solvent, and the solution is exposed to the light of a high-intensity incandescent lamp, polymerization rapidly ensues. In the preferred embodiments of our invention a small amount of an aqueous solution of an acid, preferably but not necessarily that acid whose anionic constituent is the same as the anion of the tin salt, is added to the reaction mixture, but such addition of acid is not essential to the accomplishment of our purpose. In the ensuing discussion we shall frequently refer to our photoinitiator as stannous chloride, and it shall be understood that the acid used in any acidification mentioned is hydrochloric acid, but in so doing we do not mean to limit our assertion of photoinitiator activity to this specific salt of divalent tin. Thus, instead of $SnCl_2$ we may, e.g., employ $SnSO_4$, $SnBr_2$, $SnI_2$ and $Sn(Ac)_2$, preferably with the corresponding acid as stated above.

The photoinitiators previously known in the art have been organic compounds possessing little or no solubility in water, but stannous chloride is a typical water soluble inorganic compound and has little or no solubility in many organic solvents. Accordingly, this photoinitiator is especially suitable for photopolymerizations in water solution or in reaction mixtures containing considerable quantities of water. Its use is not, however, limited to aqueous media. Photopolymerizations with stannous chloride have been carried out effectively in methanol, ethanol, n-propanol, isopropanol, glacial acetic acid, dioxane, acetone, dimethyl formamide, and dimethyl acetamide, as well as in mixtures of minor quantities of water with various organic solvents. They have also been carried out effectively in saturated aqueous zinc chloride. The polymerization does not, on the other hand, take place in dry benzene, toluene or other hydrocarbons or in other dry organic liquids of low polarity, presumably because the stannous chloride photosensitizer is incompatible with such solvents. In general an organic solvent, to be applicable to this process, should be of polar nature, as evidenced relatively high dielectric constant, miscibility with water, or similar criteria. While it is a particular virtue of photopolymerizations that they can be caused to take place at room temperature or below, they are not limited to any particular temperature range. Photopolymerization with stannous chloride as sensitizer may be caused to take at temperature ranging from below 0° C., to above 100° C., but it is expected that their main utility will be realized in the range from above 0° C. to below 100° C., more particularly in the neighborhood of room temperature (25° C.).

The reaction vessels that can be used for the processes described in this invention can be transparent to light or opaque. If the vessel is transparent, an external light source can be used. If the vessel is opaque, there must be a light source inside the vessel. "Pyrex" glassware vessels are convenient for small scale use.

The range of wavelengths which are effective for stannous chloride sensitized photopolymerization extends from about 3200 A., or below, to approximately 5000 A. For practical purposes radiation in the range from 3400 to 4500 A. is of greatest interest. When the wavelengths below 5000 A. are excluded by a filter, it has been found that very little photopolymerization takes place. A tungsten-filament projection lamp which emits only a minor fraction of its radiant energy below 5000 A. polymerizes these reaction mixtures readily. It is clear that for commercial use light sources of a sort which emit a larger fraction of their radiation in the effective wavelength range would be more efficient. Light absorption measurements reveal that the reaction mixtures absorb light very weakly in the wavelength range effective for polymerization. This is of practical importance in that it indicates that relatively thick layers of reaction mixture can be photopolymerized throughout, without serious attenuation of the effective radiation by the first thin layers of liquid upon which it is incident.

In a preferred manner of carrying out this invention a relatively small amount, e.g., from 0.001% up to 10%, based on the weight of the monomers, of the stannous compound is dissolved in the selected polymerizable solution, which is then exposed to the light source.

Since the rate of polymerization is proportional to the amount of photosensitizer present, it is desirable to use a quantity of the stannous compound sufficient to produce a practical rate of polymerization. Consequently, amounts varying from 0.01 to 1.0% are preferred.

The photopolymerization process herein described gives colorless products and allows easy control of the polymerization even when large quantities of monomer are being polymerized.

The process takes place in the presence of atmospheric oxygen and hence the polymerization vessels and the polymerizable mixtures do not require flushing with an inert atmosphere.

For the reasons cited above, stannous chloride is an especially suitable photosensitizer for photopolymerization of those monomers which are soluble in water, for example, acrylamide and acrylonitrile. Its use is not, however, limited to these monomers. Every monomer which has been examined, of the class readily polymerizable by the free-radical mechanism, has been found to be polymerizable by stannous chloride sensitized photopolymerization, and there is no reason to believe that the reaction is not general. In each case a proper monomer-solvent-stannous chloride reaction mixture composition must be established empirically if one wishes to obtain rapid and effective polymerization. In the examples below are listed conditions for the stannous chloride photosensitized photopolymerization of methyl methacrylate, methyl acrylate, styrene and vinyl acetate.

*Example I*

Five grams acrylamide was dissolved in 5.0 gms. of water in a Pyrex test tube. 0.01 gm. of stannous chloride was added and the mixture, at room temperature, was exposed to the light of a 1000 w. tungsten projection lamp at a distance of about seven inches from the reaction vessel. After 15 minutes the solution had turned to a stiff, colorless gel.

When the solution described above is placed in the dark, no polymerization had occurred after 24 hours.

*Example II*

The procedure of Example I was followed with 0.1% (by weight) of stannous chloride using a series of conventional organic solvents in the proportions of 30% by weight of monomer to 70% by weight of solvent. All runs were made with an irradiation time of 10 minutes. The solvents used were methanol, ethanol, dimethylacetamide, dimethylformamide, N-propanol, dioxane, isopropanol, acetone, and glacial acetic acid. Polymer was obtained in all cases, as was shown by an increase in viscosity and in some cases even gelation where the organic solvent was a solvent for the polymer. In other cases, the presence of polymer was shown by the formation of a precipitate.

Polyacrylamide of widely different degrees of polymerization can be obtained by this method. For instance, with dimethylformamide as solvent, a degree of polymerization of about 150,000 was obtained; with glacial acetic acid as solvent, the degree of polymerization of the polyacrylamide was about 4,000,000.

*Example III*

To determine whether or not $SnCl_2$ was essential to the reaction, a 50% solution of acrylamide in water was illuminated as in Example I for 60 minutes. There was no evidence of polymerization at the end of this time. When 0.1% $SnCl_2$ (by weight) was added, the solution had turned to a stiff gel after being irradiated for only 15 minutes.

*Example IV*

A solution of 30% acrylamide in methanol (with no sensitizer) was irradiated as in Example I for 60 minutes, without any polymer being obtained. Then 0.1% $SnCl_2$ (by weight) was added and the solution irradiated for 10 minutes. At the end of this time a large amount of precipitate had formed, indicating extensive polymerization.

*Example V*

A solution of 40% acrylonitrile (by weight) in saturated aqueous zinc chloride solution was irradiated as in Example I. The $SnCl_2$ concentration was 0.1%. After 15 minutes of irradiation, the solution had become very viscous, indicating that polymerization had occurred.

*Example VI*

The experiment described in Example V was repeated except that the solvent was dimethylformamide containing 2% water, and the solution was made slightly acid by the addition of dilute hydrochloric acid. A precipitate of polymer was formed after 15 minutes irradiation.

The experiment was repeated but without the addition of hydrochloric acid. Approximately one-half as much polymer was obtained as in the case where acid was present.

*Example VII*

The experiment as outlined in Example VI was repeated with dimethylacetamide containing 2% water, as the solvent. Again about twice as much polymer was obtained in the case where the solution was acidified than when no acid was present.

*Example VIII*

Additional experiments were run with 50% acrylonitrile in saturated aqueous zinc chloride solution without $SnCl_2$ or HCl being present. No polymer was obtained even after 90 minutes' irradiation, with the 1000 w. tungsten projector lamp. Then three drops of dilute hydrochloric acid were added and the irradiation continued for an additional 90 minutes. Again no polymer was obtained. Finally, 0.1% stannous chloride was added, and after being irradiated for 15 minutes the solution had become a very stiff gel. These results indicate that it is the stannous chloride that is the sensitizer for this process.

*Example IX*

Reaction conditions were as described in Example I, except that methyl methacrylate was the monomer in place of acrylamide, and acetone was the solvent. The solution was made slightly acid by the addition of two drops of dilute hydrochloric acid, and after 20 minutes' irradiation the solution had become highly viscous.

*Example X*

The experiment of Example IX was repeated with dimethylformamide and with dimethylacetamide as solvents. In each case the solution turned to a thick syrup, indicating that a large amount of polymer had been formed.

*Example XI*

When the experiments of Examples IX and X were repeated except with no acid present, an irradiation time of approximately three times that used when acid was present was required to give a comparable amount of polymer.

*Example XII*

A 50% solution of styrene in dimethylacetamide containing 0.1% stannous chloride was acidified with dilute hydrochloric acid, and irradiated for 60 minutes with the 1000 w. tungsten projection lamp. The solution turned to a thick gel.

The experiment was repeated and with similar results when dimethylformamide was used as the solvent.

*Example XIII*

When the conditions as described in Example XII were used with vinyl acetate as the monomer, and with dimethylacetamide and dimethylformamide as solvents, results similar to those described in Example XII were obtained.

*Example XIV*

When the conditions of Example XIII were used with methyl acrylate as monomer, polymerization was obtained as in the preceding example.

Polymer was also obtained when the monomer was polymerized in the bulk.

*Example XV*

Monomer: 40% acrylamide in water
Sensitizer: 0.1% $SnCl_2$
Illumination: 1000 w. tungsten projection lamp placed 5 inches from reaction vessel for 15 minutes In one case, air was bubbled through the polymerizing solution during irradiation, and in a second case, nitrogen gas was bubbled through. The amount of polymer formed was equal for both cases.

There are many purposes which may be served by effecting polymerization photochemically. While photochemical polymerizations are not limited to low temperatures, they can be carried out effectively at low temperatures because they are initiated by energy quanta from an outside source rather than by energy quanta derived from the thermal energy distribution of the polymerizing system. Chemical initiators of polymerization, which depend upon a thermal chemical reaction of the initiator, possess low temperature limits below which their action is so slow as not to be useful. Photochemical polymerizations are, in principle, free of such limitations.

Photochemical polymerization has also the advantage that it can be started by turning on a source of radiation, or by removing a radiation barrier interposed between a source of radiation and the polymerization system. Similarly it may be stopped by turning off the source of radiation or interposing the aforementioned radiation barrier, and its rate may be controlled by regulating the intensity of the source of radiation or regulating the degree of attenuation of the radiation by interposing screens or light filters between the radiation source and the polymerizing system.

It is obvious that the property of photopolymerizations that they may be started, stopped or modulated in rate by initiating, interrupting or modulating a stream of radiation may be utilized in various ways. As an example, in a continuous type of process a stream of polymerizable reaction mixture in which no polymerization has yet occurred may be caused to flow through a transparent reaction chamber to which radiation is applied, and therein to be polymerized. The extent and degree of polymerization may be controlled readily by variation of the intensity of spectral composition of the incident radiation, either by internal regulation of the source, by interposing light screens or filters, by varying the length or area of the reaction vessel upon which the radiation is permitted to fall, or by varying the rate of flow of the polymerizable mixture through the vessel. This same general type of control may be applied to the polymerization of a film of reaction mixture in the form of a surface coating upon an object or objects brought into the field of radiation in a controlled fashion. As an example, a moving belt may be coated with the polymerizable reaction mixture and caused to pass through a field of radiation wherein polymerization occurs, and the polymerized film thus formed may subsequently be removed from the moving belt and put to use as a self-supporting polymeric film. Alternatively the polymerizable reaction mixture may be applied to the surface of a web of fabric or other material, or to objects of various shapes and characters supported upon a moving belt, framework or other such device, and caused to pass through a field of radiation, wherein polymerization occurs and the film is converted into an adherent protective, decorative or otherwise useful surface coating upon the web or the objects aforementioned. These same objectives may, of course, be achieved in an alternative fashion of applying the polymerizable film to the belt, the web or the surface of various articles while the latter are stationary and shielded from photochemically active radiation, and subsequently exposing them to radiation. In either of these last cases it is possible to produce a design or pattern on the polymerized film or surface coating by interposing a light screen or filter, the attenuating action of which varies over its area in accordance with the desired spatial pattern.

It is a further advantage of photopolymerization that polymerization systems which require light for the initiation of polymerization can be prepared at one time or in one location, stored or transported in an unpolymerized condition, then polymerized at will in a controlled fashion, provided that they be protected from photochemically active radiation in such transportation or storage.

Various changes and modifications may be made in practicing the invention without departing from the spirit and scope thereof and, therefore, the invention is not to be limited except as defined in the appended claims. Thus, while the examples set forth above describe the preferred monomeric starting materials it should be emphasized that the process of this invention is particularly applicable to terminally unsaturated ethylenic compounds.

Specific terminally unsaturated compounds include acrylic, α-alkylacrylic, and α-chlorocrylic acid compounds such as esters, amides, and nitriles, e.g., acrylonitrile, methacrylonitrile, ethyl acrylate, isobutyl methacrylate, methacrylamide, and methyl α-chloroacrylate; vinyl and vinylidene compounds such as vinyl and vinylidene esters, ethers and ketones, e.g., vinyl acetate, vinyl propionate, vinyl chloride, vinyl bromide, vinylidene chloride and bromide, divinyl formal, methyl vinyl ketone, vinyl ethyl- and vinyl methyl ether; and ethylenically substituted aromatic hydrocarbons, e.g., styrene, alkyl styrenes such as methyl styrene, etc.

We claim:

1. A process of polymerizing a vinyl monomer comprising photopolymerizing said monomer in the presence of a catalyst consisting essentially of a stannous salt.

2. Process of claim 1 wherein the polymerization is conducted in an acidic environment.

3. Process of claim 2 wherein the catalyst is $SnCl_2$ and the reaction medium is selected from the class consisting of aqueous dimethylformamide and dimethylacetamide.

4. Process of claim 2 wherein the vinyl monomer is acrylamide.

5. Process of claim 2 wherein the vinyl monomer is acrylonitrile.

6. Process of claim 2 wherein the vinyl monomer is vinyl acetate.

7. Process of claim 2 wherein the vinyl monomer is styrene.

8. Process of claim 2 wherein the vinyl monomer is methyl methacrylate.

9. An improved photopolymerization process comprising polymerizing in the presence of light a vinyl monomer, the sole catalyst being from 0.01 to 1% of $SnCl_2$, based on the weight of the monomer and the reaction medium being an acidified solvent for $SnCl_2$.

10. An improved photopolymerization process comprising polymerizing a vinyl monomer in the presence of light, the sole catalyst being stannous chloride, said photopolymerization being carried out in an acidic solution the solvent of which being one selected from the group consisting of aqueous dimethylformamide and aqueous dimethylacetamide.

11. Process of claim 10 wherein the reaction is conducted in the absence of oxygen.

12. Process of claim 10 wherein a portion of the light to which the solution is exposed has a wavelength of 3000 to 5000 A. units.

13. An improved photopolymerization process comprising polymerizing a vinyl monomer in the presence of light and a catalyst consisting essentially of an aqueous acidified solution of stannous chloride, the solvent for said stannous chloride being a saturated solution of zinc chloride in water.

14. Process of claim 13 wherein a portion of the light to which the solution is exposed has a wavelength of 3,000 to 5,000 A. units.

References Cited in the file of this patent

FOREIGN PATENTS 455,742     Great Britain _____ Oct. 27, 1936

OTHER REFERENCES

Ellis et al.; The Chemical Action of Ultraviolet Rays (New York, 1941), pp. 408–412.

Taylor et al.; Journal of American Chemical Society, vol. 53 (July 1931), pp. 2527–2530.